United States Patent
Seo et al.

(10) Patent No.: US 10,392,275 B2
(45) Date of Patent: Aug. 27, 2019

(54) DEIONIZING DEVICE

(71) Applicant: AMOGREENTECH CO., LTD., Gimpo-si (KR)

(72) Inventors: In Yong Seo, Seoul (KR); Jun Sik Hwang, Incheon (KR)

(73) Assignee: AMOGREENTECH CO., LTD., Gyeonggi-Do (KR)

( * ) Notice: Subject to any disclaimer, the term of this patent is extended or adjusted under 35 U.S.C. 154(b) by 42 days.

(21) Appl. No.: 15/132,560

(22) Filed: Apr. 19, 2016

(65) Prior Publication Data

US 2016/0229719 A1   Aug. 11, 2016

Related U.S. Application Data

(63) Continuation-in-part of application No. PCT/KR2014/011183, filed on Nov. 20, 2014.

(30) Foreign Application Priority Data

Nov. 21, 2013 (KR) .................. 10-2013-0142350

(51) Int. Cl.
*C02F 1/469* (2006.01)
*C02F 1/461* (2006.01)
*B01D 61/48* (2006.01)
*B01D 63/10* (2006.01)

(52) U.S. Cl.
CPC ........... *C02F 1/4695* (2013.01); *B01D 61/48* (2013.01); *B01D 63/10* (2013.01); *C02F 1/46109* (2013.01)

(58) Field of Classification Search
CPC .................................. C02F 1/4691
See application file for complete search history.

(56) References Cited

U.S. PATENT DOCUMENTS

| | | | | |
|---|---|---|---|---|
| 4,251,333 A | * | 2/1981 | Suhara ............ | C08J 5/2293 205/517 |
| 4,340,680 A | * | 7/1982 | Asawa ............ | C08J 5/225 521/27 |
| 4,548,695 A | * | 10/1985 | Bridger .......... | B01J 47/08 204/284 |
| 5,993,996 A | * | 11/1999 | Firsich ........... | C04B 38/0022 429/231.8 |
| 2008/0198531 A1 | * | 8/2008 | Shiue ............. | C02F 1/46104 361/434 |

(Continued)

FOREIGN PATENT DOCUMENTS

EP    2589422 A2 *  5/2013 ......... B01D 39/1623
JP    2010513018       4/2010

(Continued)

OTHER PUBLICATIONS

International Search Report—PCT/KR2014/011183 dated Feb. 25, 2015.

*Primary Examiner* — Salil Jain
(74) *Attorney, Agent, or Firm* — Cantor Colburn LLP (57) ABSTRACT

Provided is a deionization apparatus which includes: a porous electrode having fine pores; a non-pore ion exchange membrane that is formed in the porous electrode; a counter electrode that is spaced from the non-pore ion exchange membrane and faces the non-pore ion exchange membrane; and a spacer that is located between the porous electrode and the counter electrode, and that has a flow passage through which water to be treated passes.

9 Claims, 5 Drawing Sheets

(56) References Cited

U.S. PATENT DOCUMENTS

| | | | | |
|---|---|---|---|---|
| 2009/0086409 A1* | 4/2009 | Kang | ................ | B82Y 30/00 |
| | | | | 361/502 |
| 2009/0223811 A1* | 9/2009 | Tanahashi | ............ | C02F 1/4691 |
| | | | | 204/164 |
| 2010/0078327 A1* | 4/2010 | Noh | ................ | B01D 61/50 |
| | | | | 204/633 |
| 2012/0037511 A1* | 2/2012 | Xiong | ................ | C02F 1/4604 |
| | | | | 205/746 |
| 2012/0097541 A1* | 4/2012 | Yazdanbod | ............ | B01D 61/44 |
| | | | | 204/520 |
| 2012/0199486 A1* | 8/2012 | Kang | ................ | C02F 1/46109 |
| | | | | 204/630 |
| 2013/0153426 A1* | 6/2013 | Sun | ................ | C02F 1/4691 |
| | | | | 204/638 |

FOREIGN PATENT DOCUMENTS

| | | | | |
|---|---|---|---|---|
| KR | 20050056892 | | 6/2005 | |
| KR | 100501417 | | 7/2005 | |
| KR | 20060116189 | | 11/2006 | |
| KR | 20110019573 | | 2/2011 | |
| KR | 20110034006 | | 4/2011 | |
| KR | 10-2011/0138862 | * | 12/2011 | ............ Y02E 60/13 |
| KR | 2011-0138862 | * | 12/2011 | ............ Y02E 60/13 |
| KR | 20110138862 | | 12/2011 | |
| KR | 2013-0068950 | * | 6/2013 | ............ B05D 1/04 |
| KR | 20130068950 | | 6/2013 | |

* cited by examiner

DEIONIZING DEVICE

TECHNICAL FIELD

The present invention relates to a deionization apparatus, and more specifically, to a deionization apparatus that makes a porous electrode selectively absorb negative ions or positive ions contained in water to be treated, to thereby deionize only ions of a particular polarity from the water to be treated.

BACKGROUND ART

In general, only 0.0086% of all the earth's water volume may be used. When considering disasters due to climate change in mind, water may not be available enough.

Water is very important to human life and is used variously as water for living or industrial water. Water may be contaminated with heavy metals, nitrate, fluoride, etc., due to industrial development and it is very harmful to health to drink contaminated water.

Recently, deionization technologies for purifying contaminated water and sea water for use as agricultural, industrial, or irrigation water have been variously studied.

These deionization technologies are techniques for deionization or deionization of water by removing various suspended solids or ion components contained in the sea water or polluted water such as waste water, and may employ an evaporation method to evaporate water by using a heat source such as fossil fuels or electric power, a filtration method to filter and remove foreign materials by using a separation membrane, or an electrodialysis method to remove ions by using an electrolytic action of an electrode cell.

The evaporation method evaporates moisture by using fossil fuels or electricity as a heat source, is inefficient due to the large volume of the deionization equipment, increases the manufacturing cost due to an increase in the consumption of energy, and causes contamination of air due to the use of fossil fuels.

The filtration method removes foreign matters by applying a high pressure to a separator and thus the cost of energy increases.

The electrodialysis method has to constantly replace an electrode cell with another, and does not only generate a waste factor due to the replacement of the electrode cell but also has the disadvantage of increasing human and material incidental expenses in accordance with the replacement of the electrode cell.

Korean Patent Registration Publication No. 501417 discloses a waste water deionization apparatus using a reverse osmosis membrane method/electrode method, the waste water deionization apparatus comprising: a reverse osmosis membrane device to primarily remove salt components from water to be treated in which the water to be treated is introduced with a predetermined pressure into the reverse osmosis membrane device; a deionization electrode device that secondarily removes salt components from the water that has been primarily processed in the reverse osmosis membrane device in which a spacer, a positive electrode and a negative electrode are sequentially provided in a cylindrical tank; an energy recovery device for utilizing a brine-side pressure of the reverse osmosis membrane device for use to pressurize inlet water of the deionization electrode device; a power supply device for supplying power to the positive electrode and the negative electrode provided in the deionization electrode device; and a controller for controlling valves provided in pipes through which the water to be process in order to perform a deionization process for deionizing the water to be treated in which the water to be treated is introduced into the deionization electrode device, and a reproduction process for desorbing ions adsorbed to the electrode during the deionization process. However, such a waste water deionization apparatus includes the reverse osmosis membrane device and the deionization electrode device individually and thus may cause the large size of the deionization apparatus and require a lot of manufacturing cost.

Thus, the present inventors have consistently proceeded a study on a technique of slimming a deionization apparatus and reducing a production cost, to thus invent and derive structural features capable of deionizing only particular ions from water to be treated, while having a high storage capacitance, to thereby have completed the present invention that is more economical, and possibly utilizable, and competitive.

SUMMARY OF THE INVENTION

To solve the above problems or defects, it is an object of the present invention to provide a deionization apparatus that is capable of deionizing only negative ions or positive ions contained in water to be treated.

It is another object of the present invention to provide a deionization apparatus that is assembled in a spirally wound type to improve deionization efficiency.

It is still another object of the present invention to provide a deionization apparatus capable of enabling ultra-thinning, reducing a manufacturing cost, having a high storage capacity, and obtaining a very high specific surface area, by employing a current collector that is formed by penetrating a conductive material into fine pores of a porous substrate.

It is still another object of the present invention to provide a deionization apparatus that may implement a flexible composite electrode by applying a nanofiber web or non-woven fabric whose flexibility is excellent as an electrode support.

The objects of the present invention are not limited to the above-described objects, and other objects and advantages of the present invention can be appreciated by the following description and will be understood more clearly by embodiments of the present invention.

To accomplish the above and other objects of the present invention, according to an aspect of the present invention, there is provided a deionization apparatus comprising: a porous electrode having fine pores; a non-pore ion exchange membrane that is formed in the porous electrode; a counter electrode that is spaced from the non-pore ion exchange membrane and faces the non-pore ion exchange membrane; and a spacer that is located between the porous electrode and the counter electrode, and that has a flow passage through which water to be treated passes.

In addition, according to another aspect of the present invention, there is provided a deionization apparatus comprising: a porous electrode having fine pores; a non-pore ion exchange membrane that is formed in the porous electrode; a counter electrode that faces the non-pore ion exchange membrane with a space between the counter electrode and the non-pore ion exchange membrane; a spacer that is located in a space between the porous electrode and the counter electrode, and that has a flow passage through which water to be treated passes; and an insulating layer in contact with the counter electrode or a porous electrode, wherein the porous electrode, the non-pore ion exchange membrane, the spacer, the counter electrode, and the insulating layer are rolled into a spiral shape.

In addition, according to still another aspect of the present invention, there is provided a deionization apparatus comprising: a first deionization unit that deionizes negative ions from water to be treated; and a second deionization unit that deionizes positive ions from the water to be treated, and that is connected to the first deionization unit, wherein the first deionization unit comprises: a first porous electrode; a first ion exchange membrane that is formed in the first porous electrode; a first counter electrode that faces the first ion exchange membrane with a space between the first counter electrode and the first ion exchange membrane; and a first spacer that is located in a space between the first porous electrode and the first counter electrode, and that has a flow passage through which water to be treated passes, and that is configured to deionize the negative ions from the water to be treated when a positive voltage is applied across the first porous electrode and the first counter electrode, and wherein the second deionization unit comprises: a second porous electrode; a second ion exchange membrane that is formed in the second porous electrode; a second counter electrode that faces the second ion exchange membrane with a space between the second counter electrode and the second ion exchange membrane; and a second spacer that is located in a space between the second porous electrode and the second counter electrode, and that has a flow passage through which the water to be treated passes, and that is configured to deionize the positive ions from the water to be treated when a negative voltage is applied across the second porous electrode and the second counter electrode.

As described above, a deionization apparatus according an embodiment of the present invention may provide an advantage capable of deionizing only ions of a particular polarity from water to be treated, by making a porous electrode selectively adsorb negative ions or positive ions contained in the water to be treated.

Further, a deionization apparatus according an embodiment of the present invention may adsorb ions from water to be treated that passes through a spacer by a voltage applied across a porous electrode and a counter electrode in which the porous electrode, a non-pore ion exchange membrane, a spacer, and the counter electrode are sequentially arranged.

In addition, a deionization apparatus according to an embodiment of the present invention has an assembly structure that water to be treated that is put into one side of a deionization apparatus flows along a flow passage of a spirally wound spacer, and is deionized, and purified water that is obtained by deionizing ions from the water to be treated is discharged to the other side of the deionization device, to thereby improve deionization efficiency.

In addition, a deionization apparatus according to an embodiment of the present invention may be implemented into an apparatus that may deionize both negative ions and positive ions from water to be treated in which a first deionization unit that deionizes negative ions from water to be treated and a second deionization unit that deionizes positive ions from the water to be treated are connected in series with each other.

In addition, a deionization apparatus according to an embodiment of the present invention is implemented to have a porous electrode that is formed by forming a conductive film that is formed by depositing a conductive material on a porous substrate of a laminate structure that is formed by laminating one or both selected from a nanofiber web and a nonwoven fabric in which the nanofiber web that is formed by accumulating nanofibers obtained by electrospinning a polymer material or an ion exchange solution and having fine pores, to thereby provide an effect of implementing a deionization electrode into an ultra-thin film structure to thereby have a high storage capacity at a low cost.

Further, a deionization apparatus according to an embodiment of the present invention is also implemented to have an electrode structure in which a conductive material is penetrated into fine pores of a porous substrate, to thereby provide an effect capable of manufacturing an electrode having a very high specific surface area and an ultra-thin film.

In addition, a deionization apparatus according to an embodiment of the present invention has an advantage capable of implementing a deionization flexible electrode by employing a nanofiber web or nonwoven fabric having an excellent flexibility as an electrode support.

In addition, a deionization apparatus according to an embodiment of the present invention provides a technology capable of producing a deionization electrode, which may easily control pore size of an electrode support and implement an electrode having pores of uniform size, to thereby improve efficiency of adsorption and desorption of ions, and which does not use a binder to thus avoid the binder from being dissolved and eluted and reduce a production cost with a simple production process.

In addition, a deionization apparatus according to an embodiment of the present invention is implemented to form an ion exchange membrane by electrospraying an ion exchange solution and accumulating sprayed liquid droplets, thus implementing non-pore film forms of a dense structure and having a thickness of an ultra-thin film type, to thereby have some advantages that only selected ions may freely move and a resistance to movement of ions may be reduced.

DETAILED DESCRIPTION OF THE INVENTION

Hereinafter, embodiments of the present invention will be described in detail with reference to the accompanying drawings. In the process, the size and shape of the components illustrated in the drawings may be exaggerated for convenience and clarity of explanation. Further, by considering the configuration and operation of the present invention, the specifically defined terms can be changed according to user's or operator's intention, or the custom. Definitions of these terms herein need to be made based on the contents across the whole application.

Figure 1:
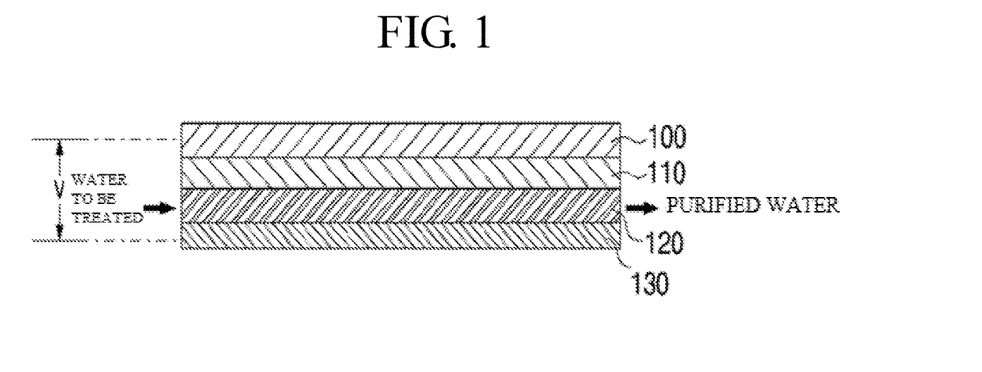
FIG. 1 is a schematic cross-sectional view illustrating a deionization apparatus according to a first embodiment of the present invention.

Referring to FIG. 1, a deionization apparatus according to a first embodiment of the present invention includes: a porous electrode 100 having fine pores; a non-pore ion exchange membrane 110 formed in the porous electrodes 100; a counter electrode 130 that is spaced from the non-pore ion exchange membrane 110 and faces the non-pore ion exchange membrane 110; and a spacer 120 that is located between the porous electrode 100 and the counter electrode 130, and that has a flow passage through which water to be treated passes.

The porous electrode 100 includes: a porous substrate formed of one selected from a nanofiber web having fine pores and a nonwoven fabric, or a laminate structure of the nanofiber web and the nonwoven fabric; and a conductive film that is formed by depositing a conductive material on the other surface or the entire surface of the porous substrate. The nanofiber web having fine pores may be formed by accumulating nanofibers obtained by electrospinning a polymer material or an ion exchange solution.

In this case, the non-pore ion exchange membrane 110 may employ a non-pore ion exchange membrane that is made by accumulating sprayed liquid droplets obtained by electrospraying an ion exchange solution on one surface of the porous substrate, or may employ a non-pore ion exchange membrane that is formed by coating an ion exchange solution on one surface of the porous substrate.

In addition, the porous electrode 100 may further include a conductive film that is formed by depositing a conductive material on the other surface of the porous substrate.

When a voltage V is applied between the porous electrode 100 and the counter electrode 130, ions included in water to be treated such as sea water or waste water passing through the spacer 120 are adsorbed on the surfaces of the porous electrode 100 and removed from the water to be treated, by electric attraction from an electric double layer formed on the surface of the porous electrode 100, to thereby discharge purified water through the spacer 120. In this case, by the electric attraction, the porous electrode 100 adsorbs ions contained in the water to be treated such as sea water or waste water.

The porous electrode 100 and the counter electrode 130 are electrodes from which a potential is generated. For example, when the porous electrode 100 is a positive electrode (cathode), the counter electrode 130 is a negative electrode (anode). In contrast, when the porous electrode 100 is the anode, the counter electrode 130 is the cathode. However, in some embodiments of the present invention, it is preferable that the porous electrode 100 is the cathode or anode, and the opposite electrode 130 is a ground electrode.

Then, the counter electrode 130 may be configured into a non-porous electrode. In this case, when ions are desorbed from the counter electrode 130 for regeneration, after ions have been adsorbed on the counter electrode 130, the ions may be prevented from being re-adsorbed on the counter electrode 130. Then, the counter electrode 130 can be referred to as an opposite electrode.

The spacer 120 is preferably a mesh or non-woven fabric.

In the deionization apparatus having this structure according to the embodiment of the present invention, the porous electrode 100 optionally absorbs negative ions or positive ions contained in water to be treated, to thus deionize only ions of a particular polarity in the water to be treated.

Figure 2:
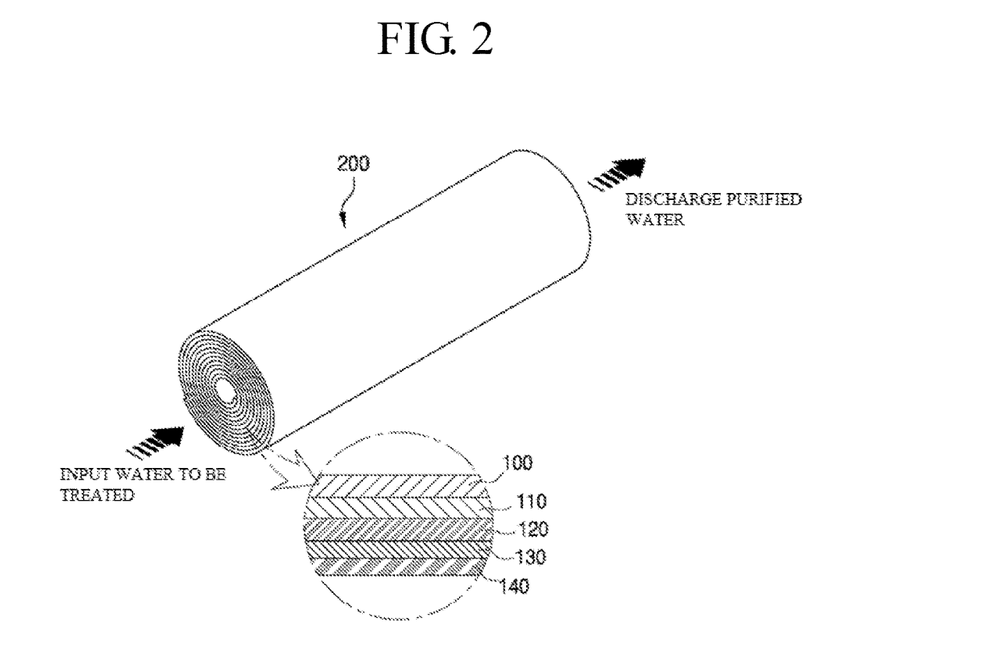
FIG. 2 is a conceptual perspective view illustrating an assembled state of a deionization apparatus according to a second embodiment of the present invention.

Referring to FIG. 2, a deionization apparatus 200 according to a second embodiment of the present invention employs a nanofiber web or nonwoven fabric having excellent flexibility as an electrode support, to thereby have very flexible characteristic to thus be implemented in a variety of assembly forms.

In some embodiments according to the present invention, for example, an insulating layer 140 is added to the structure of the deionization apparatus in which the porous electrode 100, the non-pore ion exchange membrane 110, the spacer 120, and the counter electrode 130 are sequentially positioned as shown in FIG. 1. Then, as shown in FIG. 2, the deionization apparatus 200 may be spirally wound and assembled. That is, the deionization apparatus 200 is assembled in a spirally wound shape.

Figure 3:
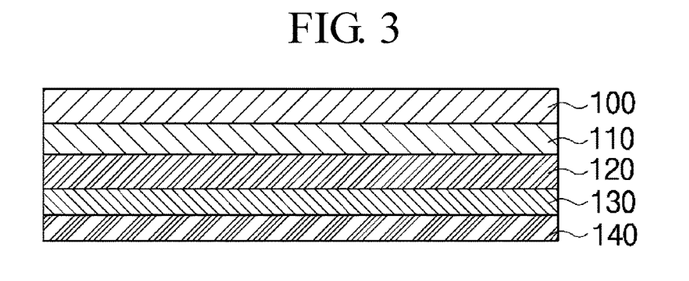
FIG. 3 is a conceptual view for explaining of structure of a deionization apparatus that is assembled in a spiral shape according to a second embodiment of the present invention.

Here, the insulating layer 140 is added to contact the counter electrode 130 or the porous electrode 100 and wound together. In FIG. 3, the insulating layer 140 is in contact with the counter electrode 130.

Meanwhile, the deionization apparatus 200 of a spirally wound assembly structure according to some embodiments of the present invention has a structure that the porous electrode 100, the non-pore ion exchange membrane 110, the spacer 120, and the counter electrode 130 are sequentially repeated from the center (roll axis) of a rolled structure towards the outer circumferential surface thereof, when the porous electrode 100, the non-pore ion exchange membrane 110, the spacer 120, and the counter electrode 130 are rolled in a sequentially laminated structure in a spiral shape. As a result, when a voltage is applied across to the porous electrode 100 and the counter electrode 130, electrical interference may occur between the neighboring repeating structures to thus cause degradation of the deionization properties.

Accordingly, the deionization apparatus 200 is spirally wound and assembled while including the insulating layer 140 for preventing the electrical interference and effect between the spirally wound repeating structures.

Therefore, since the porous electrode 100 and the counter electrode 130 are opposed to each other, and when a voltage is applied across the porous electrode 100 and the counter electrode 130, the porous electrode 100 adsorbs ions from water to be treated passing through the spacer 120. In this case, the deionization apparatus 200 according to an embodiment of the present invention has an assembly structure that water to be treated entering one side of the deionization apparatus 200 is deionized while flowing along the flow path of the spirally wound spacer 120 and deionized purified water is discharged through the other side of the deionization apparatus 200, to thus improve the deionization efficiency.

Figure 4:
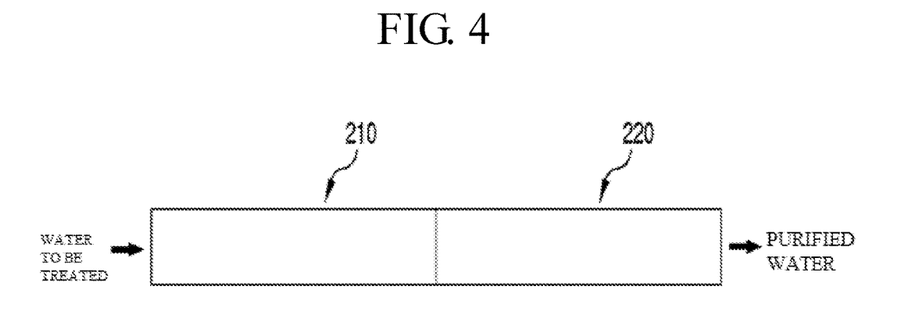
FIG. 4 is a conceptual view for explaining of structure of a deionization apparatus for deionizing negative ions and positive ions according to a third embodiment of the present invention.

FIG. 4 is a conceptual view for explaining a deionization apparatus for deionizing positive ions and negative ions according to a third embodiment of the present invention.

As described above, the deionization apparatus of the first and second embodiments of the present invention selectively adsorbs negative ions or positive ions from water to be treated flowing through the spacer located between the porous electrode and the counter electrode, and thus deionizes ions of a particular polarity.

However, as shown in FIG. 4, the deionization apparatus according to the third embodiment of the present invention may be implemented to include a first deionization unit 210 that deionizes negative ions from water to be treated and a second deionization unit 220 that deionizes positive ions therefrom in which the first and second deionization units 210 and 220 are connected in series with each other, to thereby deionize both negative and positive ions from the water to be treated.

In other words, the first deionization unit 210 includes: a first porous electrode; a first ion exchange membrane that is formed in the first porous electrode; a first counter electrode that faces the first ion exchange membrane with a space between the first counter electrode and the first ion exchange membrane; and a first spacer that is located in a space between the first porous electrode and the first counter electrode, and that has a flow passage through which water to be treated passes, and that is configured to deionize the negative ions from the water to be treated when a positive voltage is applied across the first porous electrode and the first counter electrode.

In addition, the second deionization unit 220 includes: a second porous electrode; a second ion exchange membrane that is formed in the second porous electrode; a second counter electrode that faces the second ion exchange membrane with a space between the second counter electrode and the second ion exchange membrane; and a second spacer that is located in a space between the second porous electrode and the second counter electrode, and that has a flow passage through which the water to be treated passes, and that is configured to deionize the positive ions from the water to be treated when a negative voltage is applied across the second porous electrode and the second counter electrode.

Here, the first spacer of the first deionization unit 210 is connected with the second spacer of the second deionization unit 220. Accordingly, the first deionization unit 210 deionizes negative ions from water to be treated that flows into the first spacer to then supply the water to be treated from which the negative ions have been removed to the second spacer of the second deionization unit 220 and thus the second deionization unit 220 deionizes positive ions from the water to be treated from which the negative ions have been removed. Therefore, the deionization apparatus according to the third embodiment of the present invention deionizes negative ions from water to be treated that flows into the first spacer of the first deionization unit 210 and then supplies the water to be treated from which the negative ions have been removed to the second spacer of the second deionization unit 220 to thus deionize positive ions therefrom. Accordingly, the deionization apparatus according to the third embodiment of the present invention deionizes both negative ions and positive ions from water to be treated.

The porous electrode in the deionization apparatus according to the third embodiment of the present invention is implemented to include an ion exchange membrane that may be formed in a variety of ways. The specific method and structure for the ion exchange membrane will be described below.

Figure 5:
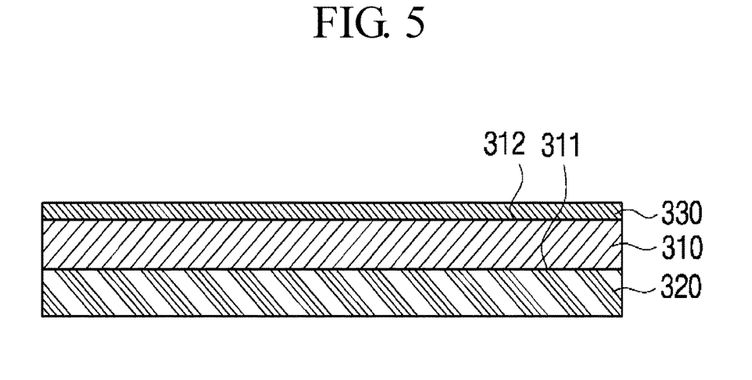
FIG. 5 is a conceptual view for explaining that a porous electrode having a non-pore ion exchange membrane according to some embodiments of the present invention.

First of all, referring to FIG. 5, a porous electrode including a non-pore ion exchange membrane according to some embodiments of the present invention, includes a porous substrate 310 having fine pores; a non-pore ion exchange membrane 320 is formed by directly electrospraying an ion exchange solution on one surface 311 of the porous substrate 310; and a conductive film 330 is formed on at least the other surface 312 of the porous substrate 310.

The non-pore ion exchange membrane 320 may be a positive ion exchange membrane or a negative ion exchange membrane according to polarity of the electrode, and the non-pore ion exchange membrane 320 serves to selectively adsorb ions to the electrode. That is, the negative ion exchange membrane is coupled to a positive electrode, and the positive ion exchange membrane is coupled to a negative electrode. Thus, when a voltage is applied across the positive electrode and the negative electrode, only the positive ions are adsorbed to the negative electrode, and only the negative ions are adsorbed to the positive electrode.

Then, when the ion exchange solution is electrosprayed, fine-sized liquid droplets are sprayed from an electrospraying nozzle, and are more finely differentiated by an electric force to then be accumulated to thereby form the ion exchange membrane 320 in a non-pore film form.

When the non-pore ion exchange membrane 320 has a non-pore form, selective permeability of ions may be increased. Meanwhile, the ion exchange membrane 120 having pores may allow all positive and negative ions to pass through the pores in spite of electrical attraction or repulsion, and thus may not provide a preferred structure.

In this way, in some embodiments of the present invention, the non-pore ion exchange membrane 320 is formed by electrospraying the ion exchange solution and accumulating sprayed liquid droplets, thus implementing non-pore film forms of a dense structure and having a thickness of an ultra-thin film type, to thereby have some advantages that only selected ions may freely move and a resistance to movement of ions may be reduced.

The conductive film 330 may be formed by depositing a conductive material on at least the other surface 312 of the porous substrate 310. Here, the conductive material may be at least one metal such as nickel (Ni), copper (Cu), stainless steel (SUS), titanium (Ti), chromium (Cr), manganese (Mn), iron (Fe), cobalt (Co), zinc (Zn), molybdenum (Mo), tungsten (W), silver (Ag), gold (Au), and aluminum (Al). Preferably, a deposition film may be formed by depositing copper. Here, the conductive material may be deposited on only the other surface 312 of the porous substrate 310, preferably, the conductive materials may be deposited on the whole surfaces of the porous substrate 310 including one surface 311 and the other surface 312 of the porous substrate 310.

The porous substrate 310 may employ a nanofiber web having fine pores formed by accumulating nanofibers by electrospinning a polymer material, or a nonwoven fabric, or a lamination structure of the nanofiber web and a nonwoven fabric. The lamination structure of the nanofiber web and the nonwoven fabric may be a structure that the nanofiber web is laminated on one surface of the nonwoven fabric, or a structure that the nanofiber webs are laminated on both surfaces of the nonwoven fabric. Here, when a porous electrode including a non-pore ion exchange membrane is implemented by employing the lamination structure of a nanofiber web, a nonwoven fabric or a lamination structure of the nanofiber web and the nonwoven fabric, an electrode having a high specific surface area may be produced.

That is, the porous substrate 310 may be applied as the lamination structure of the nanofiber web and the nonwoven fabric, or the lamination structure of the nanofiber web/the nonwoven fabric/the nanofiber web. In this case, thickness of the nanofiber web is preferably thinner than that of the nonwoven fabric. Here, the nanofiber web and the nonwoven fabric may be laminated through a lamination process.

Thus, when the porous electrode having the non-pore ion exchange membrane is formed by employing the lamination structure of the nanofiber web and the nonwoven fabric, the nonwoven fabric is more inexpensive than the nanofiber web, and the former has the higher strength than the latter, to thereby reduce the production cost of the porous electrode having the non-pore ion exchange membrane and simultaneously improve the strength thereof. In addition, since the nonwoven fabric also includes a large number of pores, a conductive material for deposition may be penetrated into the nonwoven fabric.

Meanwhile, a porous thin film that is formed by accumulating nanofibers obtained by electrospinning an ion exchange solution may be employed as the porous substrate 310.

The porous substrate 310 is provided with fine pores. Accordingly, when the conductive material is deposited on the porous substrate 310 having fine pores, the deposited conductive material is penetrated into the fine pores, and thus deposition films are formed inside the fine pores, and the pores of the porous substrate 310 after deposition become finer than those of the porous substrate 310 before deposition. Thus, the porous electrode having the non-pore ion exchange membrane according to the embodiment of the present invention has an electrode structure having fine pores capable of adsorbing ions, which will be used as a capacitive deionization electrode.

Figure 6A:
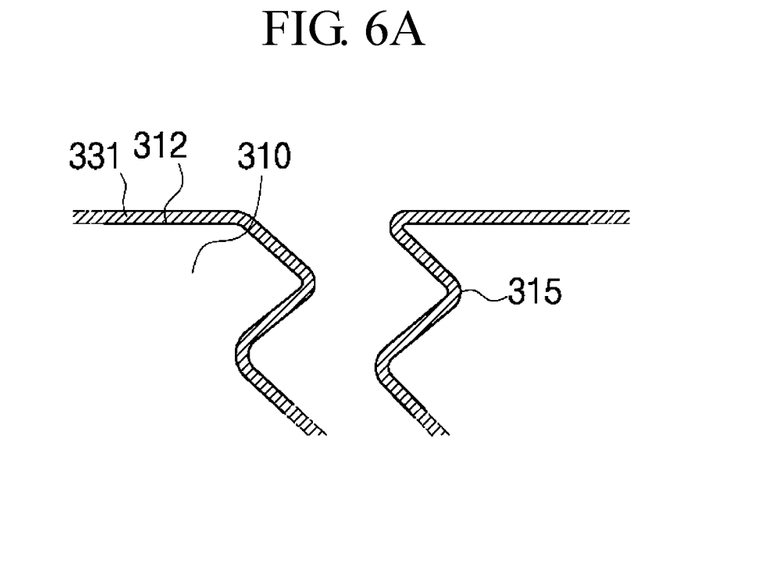
FIGS. 6A and 6B are a conceptual view for explaining that a deposition material is penetrated into fine pores of a porous substrate having a non-pore ion exchange membrane that is applied to the first embodiment of the present invention.

That is, as shown in FIG. 6A, a conductive material 331 that is deposited on the other side 312 or the entire surface of the porous substrate 310 is penetrated into the fine pores 315, to thus form a porous electrode.

Figure 6B:
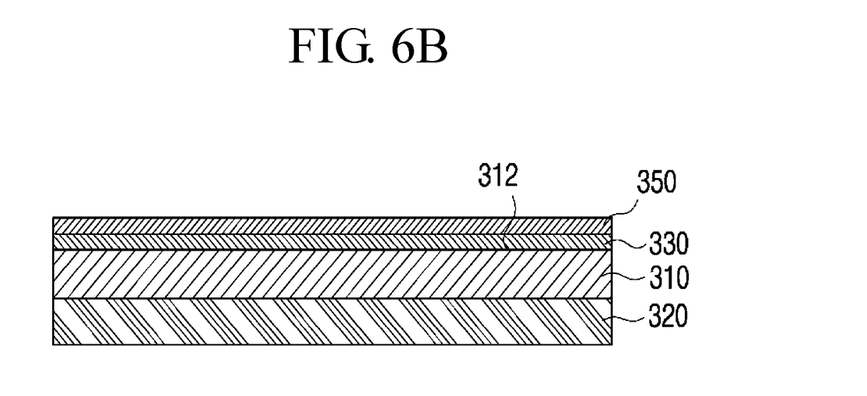

Referring to FIG. 6B, a porous electrode having a non-pore ion exchange membrane according to some embodiments of the present invention further includes a coat layer 350 coated on the conductive film 330 formed on the porous substrate 310, in which the coat layer 350 serves to act as a current collector.

The coat layer 150 plays a role of improving the electrical conductivity of the porous electrode having the non-pore ion exchange membrane, and does not require a separate current collector. Accordingly, the porous electrode having the non-pore ion exchange membrane may be ultra-thinned and slimmed, to thereby reduce the size of a deionization apparatus. Here, the coat layer 350 is coated on the conductive film 330 formed on the porous substrate 310 and is formed on only one surface of the porous substrate 310. That is, since the electrode in the deionization apparatus applied to some embodiments of the present invention is implemented as a sheet in order to play a role of an electrode and a current collector simultaneously, and the conductive film 330 that is formed by depositing the conductive material does not have a sufficient electrical conductivity for the deionization apparatus, the coat layer 350 is required.

Then, the reason for forming the coat layer 350 on only one surface of the porous substrate 310 is that pores are usually blocked when plating, and thus an electrode portion of the porous electrode having the ion exchange membrane should be porous. Accordingly, the coat layer 350 is not formed in the electrode portion.

Thus, the porous electrode having the non-pore ion exchange membrane according to some embodiments of the present invention has an electrode structure in which the conductive material is penetrated into the fine pores of the porous substrate such as the nanofiber web, and thus has the advantage of producing an electrode of a very high specific surface area, and an ultra-thin film electrode having a thickness of 1 μm to 50 μm.

In addition, the present invention has an advantage capable of implementing the porous electrode having the non-pore ion exchange membrane by employing a nanofiber web or nonwoven fabric having an excellent flexibility as an electrode support, and mounting the porous electrode having the non-pore ion exchange membrane even in a deionization apparatus of a curved intrinsic shape.

Moreover, the present invention provides an electrode which does not use a binder to thus avoid the binder from being dissolved and eluted and may reduce a production cost with a simple production process.

In addition, the present invention has an advantage capable of manufacturing a porous electrode having a non-pore ion exchange membrane by penetrating a conductive material into fine pores of a porous substrate, to thus reduce a production cost and have a high storage capacity at a lower cost.

Figure 7:
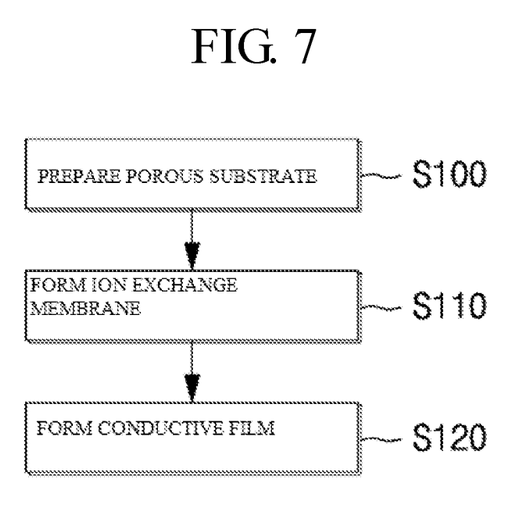
FIG. 7 is a flowchart of a method of manufacturing a porous electrode having a non-pore ion exchange membrane according to some embodiments of the present invention.

FIG. 7 is a flowchart of a method of manufacturing a porous electrode having a non-pore ion exchange membrane according to some embodiments of the present invention.

Referring to FIG. 7, the method of manufacturing a porous electrode having a non-pore ion exchange membrane in accordance with some embodiments of the present invention includes preparing a porous substrate of a lamination structure of a nanofiber web, a nonwoven fabric or a lamination structure of the nanofiber web and the nonwoven fabric in which the nanofiber web is formed by accumulating nanofibers obtained by electrospinning a polymer material and includes fine pores (S100).

Here, the porous nanofiber web may be obtained by electrospinning a mixed spinning solution that is formed by dissolving a single kind of a polymer or a mixture of at least two kinds of polymers in a solvent, or may be obtained by dissolving respectively different polymers in a solvent and then cross-spinning the electrospun spinning solution through respectively different spinning nozzles.

When forming a mixed spinning solution by using two types of polymers, for example, in the case of mixing polyacrylonitrile (PAN) as a heat-resistant polymer and polyvinylidene fluoride (PVDF) as an adhesive polymer, it is preferable to mix both in a range of 8:2 to 5:5 at a weight ratio.

In the case that a mixing ratio of the heat-resistant polymer and the adhesive polymer is less than 5:5 at a weight ratio, heat resistance performance of the mixed spinning solution falls to thus fail to exhibit required high temperature properties. On the contrary, in the case that a mixing ratio of the heat-resistant polymer and the adhesive polymer is larger than 8:2 at a weight ratio, the intensity of the mixed spinning solution falls to thereby cause a spinning trouble to occur.

In some embodiments of the present invention, considering that the solvent volatilization may not be well achieved depending on the type of the polymer when using a single solvent, it may be designed to pass through a pre-air dry zone by a pre-heater after a spinning process, and to undergo a process of adjusting the amount of the solvent and moisture remaining on the surface of the porous nanofiber web, as will be described later.

Any polymers may be used in the case of fiber forming polymers that may be dissolved in a solvent to thus form a spinning solution, and then may be spun in an electrospinning method to thus form nanofibers.

The heat-resistant polymer resin that may be used in the present invention is a resin that may be dissolved in an organic solvent for electrospinning and whose melting point is 180° C. or higher, for example, any one selected from the group consisting of: aromatic polyester such as polyacrylonitrile (PAN), polyamide, polyimide, polyamide-imide, poly meta-phenylene iso-phthalamide, polysulfone, polyether ketone, polyethylene terephthalate, polytrimethylene terephthalate, and polyethylene naphthalate; polyphosphazenes such as polytetrafluoroethylene, polydiphenoxy phosphazene, and poly {bis [2-(2-methoxyethoxy) phosphazene]}; polyurethane copolymer containing at least one of polyurethane and polyether urethane; cellulose acetate; cellulose acetate butylrate; and cellulose acetate propionate.

The porous nanofiber web is made of ultra-fine nanofibers that are formed by dissolving a single or mixed polymer in a solvent to thus form a spinning solution, and spinning the spinning solution, and then is calendered at a temperature below or equal to a melting point of the polymer thereby adjusting sizes of the pores and thickness of the web.

The porous nanofiber web is formed of, for example, nanofibers to have a diameter of 1 nm to 150 µm, and are set to 1 µm to 100 µm thick, preferably set to 10 µm to 30 µm in thickness. The sizes of the fine pores are set to several hundred nm to several ten µm, and the porosity is set to 50% to 90%.

In this case, the porous substrate may be formed of a porous nonwoven fabric alone or may be formed by laminating the porous nanofiber web and a porous nonwoven fabric, if necessary, in order to reinforce the strength of the support. The porous nonwoven fabric may employ any one of a nonwoven fabric made of PP/PE fibers of a double structure in which polyethylene (PE) is coated on the outer periphery of polypropylene (PP) fibers, as a core, a polyethylene terephthalate (PET) nonwoven fabric made of PET fibers, and a nonwoven fabric made of cellulose fibers.

Then, a non-pore ion exchange membrane is formed (S110) in which the non-pore ion exchange membrane is formed by electrospraying an ion exchange solution on one surface of the porous substrate and accumulating sprayed liquid droplets, and a conductive film is formed by depositing a conductive material on the other surface of the porous substrate (S120).

Figure 8A:
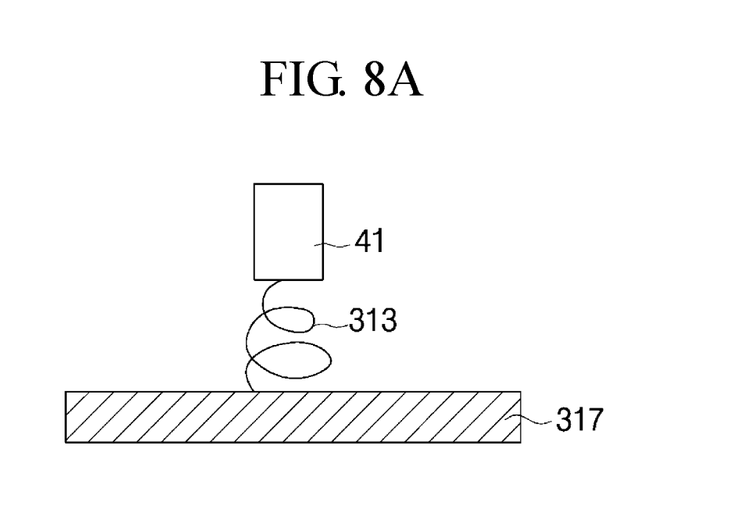
FIGS. 8A and 8B are schematic cross-sectional views for explaining a process of forming a porous substrate and a non-pore ion exchange membrane in the method of manufacturing a porous electrode having a non-pore ion exchange membrane according to some embodiments of the present invention.
Figure 8B:
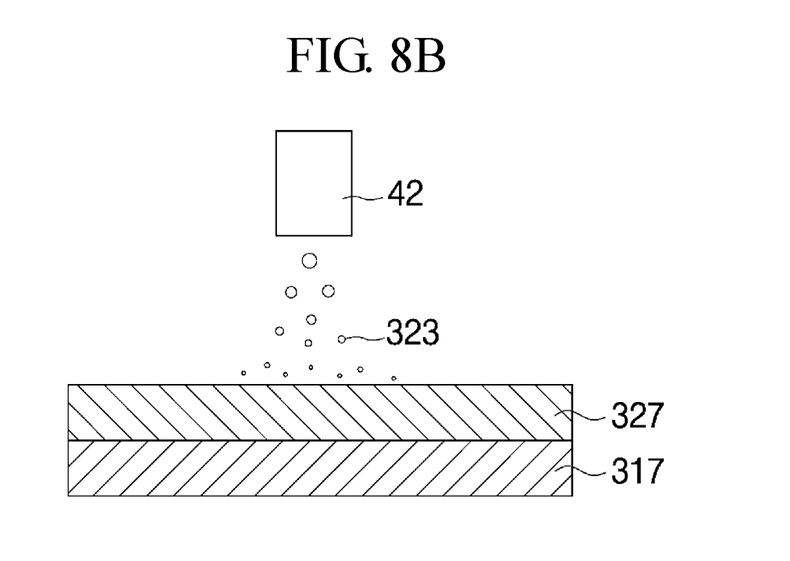

In this way, the porous electrode having an ultra-thin non-pore ion exchange membrane is prepared. When implementing a porous substrate with a nanofiber web, as shown in FIG. 8A, a spinning solution is electrospun through a nozzle 41 that the spinning solution is formed by dissolving a polymer material in a solvent to thus form and accumulate nanofibers 313 to thereby form the nanofiber web 317. Then, as shown in FIG. 8B, a non-pore ion exchange membrane 327 is formed by electrospraying an ion exchange solution on one surface of the nanofiber web 317 through a nozzle 42 and thus accumulating the sprayed liquid droplets 323.

Meanwhile, the conductive film may be formed by using a deposition process using a CVD (Chemical Vapor Deposition) method or a PVD (Physical Vapor Deposition) method, depending on a material of the conductive material.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention provides a deionization apparatus capable of deionizing only ions of a particular polarity from water to be treated, by making a porous electrode selectively adsorb negative ions or positive ions contained in the water to be treated.

The invention claimed is:

1. A deionization apparatus comprising:
   a porous electrode including a porous substrate, wherein the porous substrate is formed of a non-woven fabric, a first porous nanofiber web having first pores and laminated on one surface of the non-woven fabric and a second porous nanofiber web having second pores and laminated on the other surface of the non-woven fabric, and the first porous nanofiber web and the second porous nanofiber web is formed of electrospun and accumulated nanofibers, the nanofibers being made of a polymer material;
   a non-pore ion exchange membrane formed on the second porous nanofiber web;
   a conductive film formed on the first porous nanofiber web, the conductive film being made of a conductive material, wherein the conductive material is coated on inner surfaces of the first pores;
   a counter electrode facing and spaced from the non-pore ion exchange membrane; and
   a spacer located between the non-pore ion exchange membrane and the counter electrode, and having a flow passage through which water to be treated passes,
   wherein a thickness of the first porous nanofiber web and the second porous nanofiber web is thinner than that of the non-woven fabric.

2. The deionization apparatus of claim 1, wherein the conductive film is formed by depositing the conductive material.

3. The deionization apparatus of claim 1, further comprising a coat layer coated on the conductive film.

4. The deionization apparatus of claim 1, wherein the counter electrode is a ground electrode.

5. The deionization apparatus of claim 1, wherein the counter electrode is a non-porous electrode.

6. The deionization apparatus of claim 1, wherein the spacer is a mesh or a nonwoven fabric.

7. The deionization apparatus of claim 1, wherein the polymer material includes a mixed polymer material of polyacrylonitrile (PAN) and polyvinylidene fluoride (PVDF), mixing ratio being in a range of 4:1 to 1:1 at a weight ratio.

8. The deionization apparatus of claim 1, wherein the non-pore ion exchange membrane is formed of an electrosprayed and accumulated ion exchange material.

9. The deionization apparatus of claim 1, wherein the first pores and the second pores have a diameter in a range of 1 nm to 100 µm, and the first porous nanofiber web and the second porous nanofiber web have a porosity in a range of 50% to 90%.

* * * * *